(12) United States Patent
Werber

(10) Patent No.: US 8,810,805 B2
(45) Date of Patent: Aug. 19, 2014

(54) LIGHT SOURCE FOR A SENSOR AND A DISTANCE-MEASURING OPTOELECTRONIC SENSOR

(71) Applicant: Sick AG, Waldkirch (DE)

(72) Inventor: Armin Werber, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 13/756,982

(22) Filed: Feb. 1, 2013

(65) Prior Publication Data

US 2013/0229668 A1 Sep. 5, 2013

(30) Foreign Application Priority Data

Mar. 5, 2012 (DE) .......................... 10 2012 101 811

(51) Int. Cl.
*G01B 11/14* (2006.01)
*G02B 6/27* (2006.01)
*G01S 17/42* (2006.01)
*G01S 7/481* (2006.01)
*G02B 26/00* (2006.01)
*G02B 13/06* (2006.01)
*G02B 6/35* (2006.01)

(52) U.S. Cl.
CPC ............ *G02B 6/2726* (2013.01); *G02B 6/0001* (2013.01); *G02B 6/0028* (2013.01); *G01S 17/42* (2013.01); *G01S 7/4814* (2013.01); *G02B 6/0033* (2013.01); *G01B 11/14* (2013.01); *G02B 26/005* (2013.01); *G02B 13/06* (2013.01); *G01S 7/4816* (2013.01); *G01S 7/4817* (2013.01); *G02B 6/3538* (2013.01)
USPC ........................................ 356/614

(58) Field of Classification Search
CPC .................................................. G01B 11/026
USPC ................ 356/614, 141.1; 345/690; 359/316
See application file for complete search history.

(56) References Cited

U.S. PATENT DOCUMENTS 6,204,916 B1  3/2001  Norita et al.
2005/0283148 A1 * 12/2005  Janssen et al. .................. 606/34

(Continued)

FOREIGN PATENT DOCUMENTS

DE          202011052106       * 11/2011
DE     10 2012 101 811 B3     11/2012

(Continued)

OTHER PUBLICATIONS

European Patent Office, Search Report, Application No. EP 13 15 2429, issued on May 14, 2013, four (4) pages.
German Examination Report with citations, three (3) pages.

*Primary Examiner* — Tarifur Chowdhury
*Assistant Examiner* — Md Rahman
(74) *Attorney, Agent, or Firm* — Nath, Goldberg & Meyer; Jerald L. Meyer; Sanjana Mangalagiri

(57) ABSTRACT

A laserscanner comprising a new light source is described wherein the light beam is no more deflected by a rotating mirror but rather comprises a ring like light-guiding element with an adjacent channel on the convex side. The channel contains two polar fluids having different refractive indexes, which fluids are not mixed and can be moved in said channel in the longitudinal direction by means of electrical forces due to the effect of electrowetting. The refractive indexes are suitable chosen such that total reflection occurs at the first fluid and a coupling out of the light where the second fluid is located. In that way the second fluid acts like a revolving window through which the light can exit. Such a scanner has no more mechanical wear with enhancement of the lifetime and capabilities.

9 Claims, 2 Drawing Sheets

(56) References Cited

U.S. PATENT DOCUMENTS

| | | |
|---|---|---|
| 2007/0013990 A1 | 1/2007 | Hendriks et al. |
| 2009/0052000 A1 | 2/2009 | Sakata |
| 2010/0165451 A1 | 7/2010 | Chu et al. |
| 2012/0056342 A1* | 3/2012 | Koslow .............................. 264/8 |

FOREIGN PATENT DOCUMENTS

| | | |
|---|---|---|
| EP | 1 542 056 A2 | 6/2005 |
| EP | 2 124 069 B1 | 11/2009 |
| WO | 2004097495 A1 | 11/2004 |
| WO | 2008097440 A2 | 8/2008 |

* cited by examiner

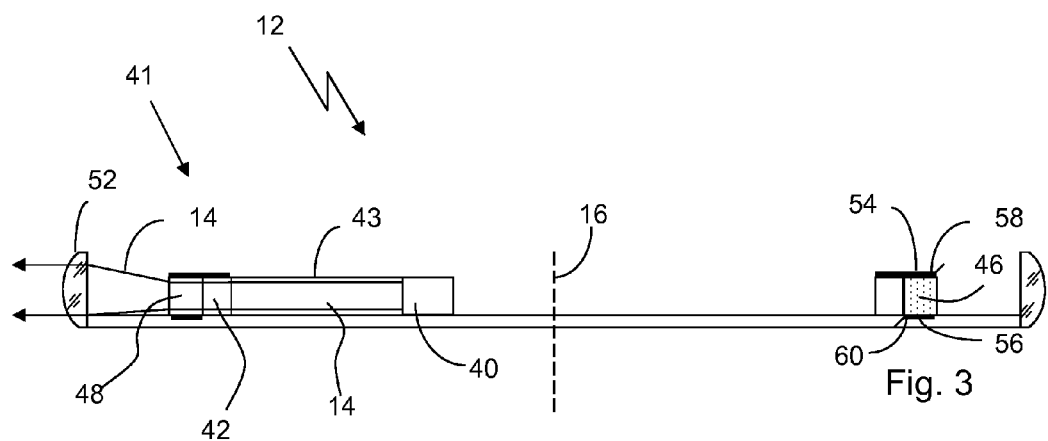
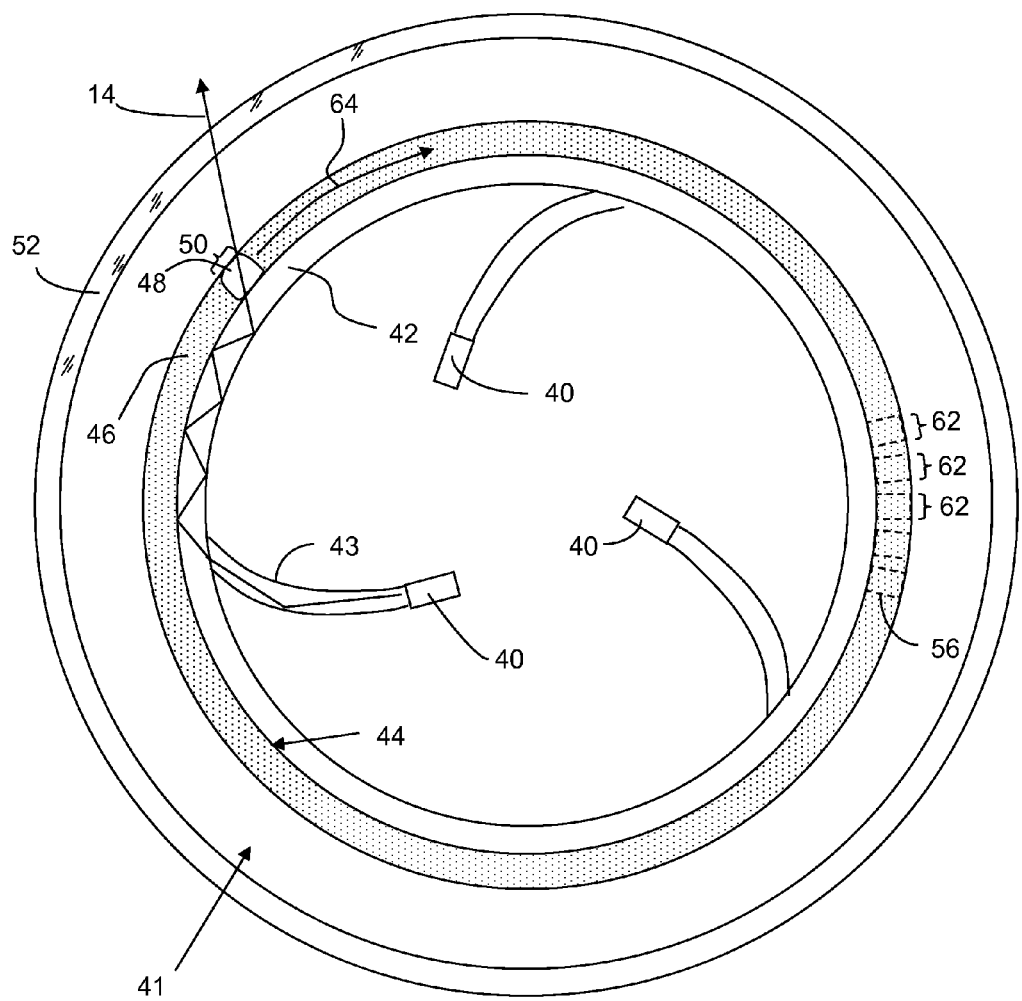

LIGHT SOURCE FOR A SENSOR AND A DISTANCE-MEASURING OPTOELECTRONIC SENSOR

The invention relates to a light source for a sensor which can transmit the light in different observation directions, with a light transmitting element for the generation of transmitted light and a deflection unit, with which the transmitted light can be deflected in different directions. The invention relates also to a distance-measuring optoelectronic sensor for detecting objects and/or object contours in a monitoring region having a light source for the transmission of transmitted light into the monitoring region, a light receiver for the reception of remitted or reflected received light out of the monitoring region and an evaluation unit which is adapted to gain a position of detected objects and/or an object contour from the time-of-flight of the light between transmission of the transmitted light and reception of the received light and from the observation direction.

For many measuring and monitoring applications laser scanners are used which detect the spatial structure of their environment in the form of a distance profile of a fixed area. A transmitted beam is deflected up to an angular range of 360° by means of a rotating mirror in order to scan the plane in discrete angular steps. A short pulse of light is emitted at each angle and the time of flight until reception of the reflected light which is reflected or remitted at an object is measured. The time of flight is then converted via the speed of light into a range information (TOF). An alternative method for determining the light propagation time is measuring the phase shift between the amplitude-modulated transmitted light and the amplitude-modulated received light. In this way object positions or object contours are determined in polar coordinates. Yet, an objective distinction between the detection of an object contour or an object cannot be made since each partial contour can be regarded as an object and vice versa.

In particular, for scanning TOF laser rangefinder which monitor a relatively large angular range of up to 360° in at least one transmission or detection plane, it is known to deflect the in principle one-dimensional scanning laser beam, i.e. the emitted radiation, within this plane at a predetermined angular resolution which determines the spatial resolution. For this, it is known to deflect the scanning beam—also known as measuring or rotating beam—of the detecting devices—simply referred to as sensors—by means of a motor-driven rotating prism or by means of rotating mirror tilted by 45° to the optical axis. In these cases the axis of rotation of the prism or of the mirror and the optical axis of the sensor are parallel. In an alternative embodiment, the entire electro-optical unit of the sensor are brought into rotation. Here, both the transmitting and the receiving aperture are moved on a circular path in order to ensure that the scanning beam of the sensor scans the desired angular range of up to 360°.

These solutions have the disadvantage that relatively large masses have to be moved, in particular rotated. The required electric power contributes in no small extent to the total power consumption of the sensor. Another disadvantage is that the required bearing of the rotating components limits significantly the lifetime of the sensor. Another disadvantages is that by the serial sampling of the scanning movement, the measuring frequency is limited to values in the range around 30 Hz. The mechanical rotation movement makes the system vulnerable to mechanical wear and environmental influences. The space required for the rotating mirror leads to a certain minimal design size. The rotating mirror ensures not only for the deflection of the transmitted light, but also ensures that the field of view of the receiver is directed towards the direction to be monitored and that the field of view is limited in order to keep interference effects due to stray light low. In most practical embodiments the mechanical structure of the scanner and of the rotary mirror covers part of the horizontal field of view, so that mostly only up to 270° are available instead of 360 generally. Ultimately, costs are relatively high due to precision requirements and complex adjustment and installation.

EP 2124069 B1 discloses a laser scanner with a 360° panoramic optics which is provided both in the transmission light path and the receiving path. It does avoid rotating mechanical parts and thus wear, but the energy yield is extremely low as the transmitted light beam is send in 360° and of which only a fraction is reflected off an object in the scanning region. Also, then a spatially resolving receiving optics has to be used in order to achieve at all an angular resolution and to determine from which direction the reflected light arrives.

US 2010/0165451 A1 discloses light deflecting devices using the effect of electrowetting.

US 2007/0013990 A1 discloses a miniature motor, the rotor of which is driven by liquids and the effect of electrowetting. The miniature motor can be used in an optical scanner for rotating a mirror.

It is an object of the invention to provide an improved light source and a sensor equipped with such a source with which the aforementioned disadvantages can be avoided.

This object is achieved by a light source for an optoelectronic sensor or a sensor with such a light source as disclosed hereafter.

The inventive light source can emit light in different directions of observation, and comprises a light transmitting element for the generation of transmitted light and a deflection unit, with which the transmitted light can be deflected in different directions. In the inventive subject matter the deflector comprises a curved light-guiding element in which the transmitted light can be coupled into. A channel is immediately adjacent to the convex side of said light-guiding element, and the channel contains two polar fluids having different refractive indexes, which fluids are not mixed and can be moved in said channel in the longitudinal direction by means of electrical forces due to the effect of electrowetting, wherein the refractive index of the first fluid is smaller than the one of the light-guiding element, so that the transmitted light coupled into the light-guiding element is totally reflected in those sections in which the first fluid is adjacent said light-guiding element. The refractive index of the second fluid is equal to or greater than the one of the light-guiding element, so that the coupled transmitted light is uncoupled from the light-guiding element in those sections in which the second fluid is adjacent to said light-guiding element.

A distance measuring sensor (laser scanner) with such a light source has no more mechanical wear which effects correspondingly the lifetime and capabilities. The rotational movement of the scanning beam is effected by means of uncoupling of the second fluid which is moved in the channel. Thus only in the region in which the second fluid is located momentarily the total reflection is interrupted due to the lower refractive index of the second fluid, and the light can escape. The second fluid then acts almost like a revolving window through which the light can exit. If the channel is circular, a rotating scanning beam is obtained. Since the polar fluids are moved solely by electric forces, no moving parts are necessary. The functionality of forces exerted on polar liquids by electrowetting is well described in L Yeo, J Friend, Electrowetting, Applications in Encyclopedia of Microfluidics and Nanofluidics (ed. D Li) pp. 606-615 (Springer, New York, 2008).

A further advantage is that the deflection unit is resistant to vibrations and shocks because the mass of the fluids can be kept very small and the channel is a so-called micro-channel, and therefore, the fluid mass is much more resistant to accelerations than a macroscopic deflection unit with a rotating mirror and a motor.

Preferably, the light-guiding element is a ring of fiber optic of polydimethylsiloxane or polycarbonate.

The second fluid covers only a fraction of the fiber ring perimeter and the rest of the channel is filled with the first fluid so that only a beam, which cross-section is as small as possible and which is preferably directed, is emitted from the light source.

A good movement of fluids by means of electrowetting can be achieved when the electrodes are directly adjacent to the channel.

In a further embodiment of the subject of invention an omnidirectional receiving optics is provided to direct the received light from each viewing direction onto the light receiver.

It is advantageous if an electrically controllable optical element is arranged upstream of the light receiver with a plurality of controllable zones whose light permeability can be controlled, and whereby a selectable viewing direction can be predetermined by higher light transmittance of zones which are associated with the chosen direction of observation and lower light transmission of the remaining zones. This has the advantage that ambient light from other directions than the one of interest reaches less the receiver. This leads to an increased durability and reliability of the object detecting as well as to increase of the sensitivity and therewith increase of the range.

It is advantageous that then, the virtual rotation of the electrically controllable optical element is synchronized with the rotational speed of the second fluid.

In one embodiment the omnidirectional receiving optics could comprise a star-like aperture, which divides the monitoring region into sectors. In that way a portion of the ambient light is blocked out in an easy way.

The invention is described by way of example and with regard to other features and advantages described with reference to embodiments and with reference to the accompanying drawing. The drawing shows in:

FIG. 1 a schematic representation of a sensor of the inventive subject matter with the essential components;

FIG. 2 a schematic plan view of a star-like aperture;

FIG. 3 is a schematic sectional view of the inventive light source;

FIG. 4 is a plan view of the light source of FIG. 3 to illustrate the principle of operation.

Figure 1:
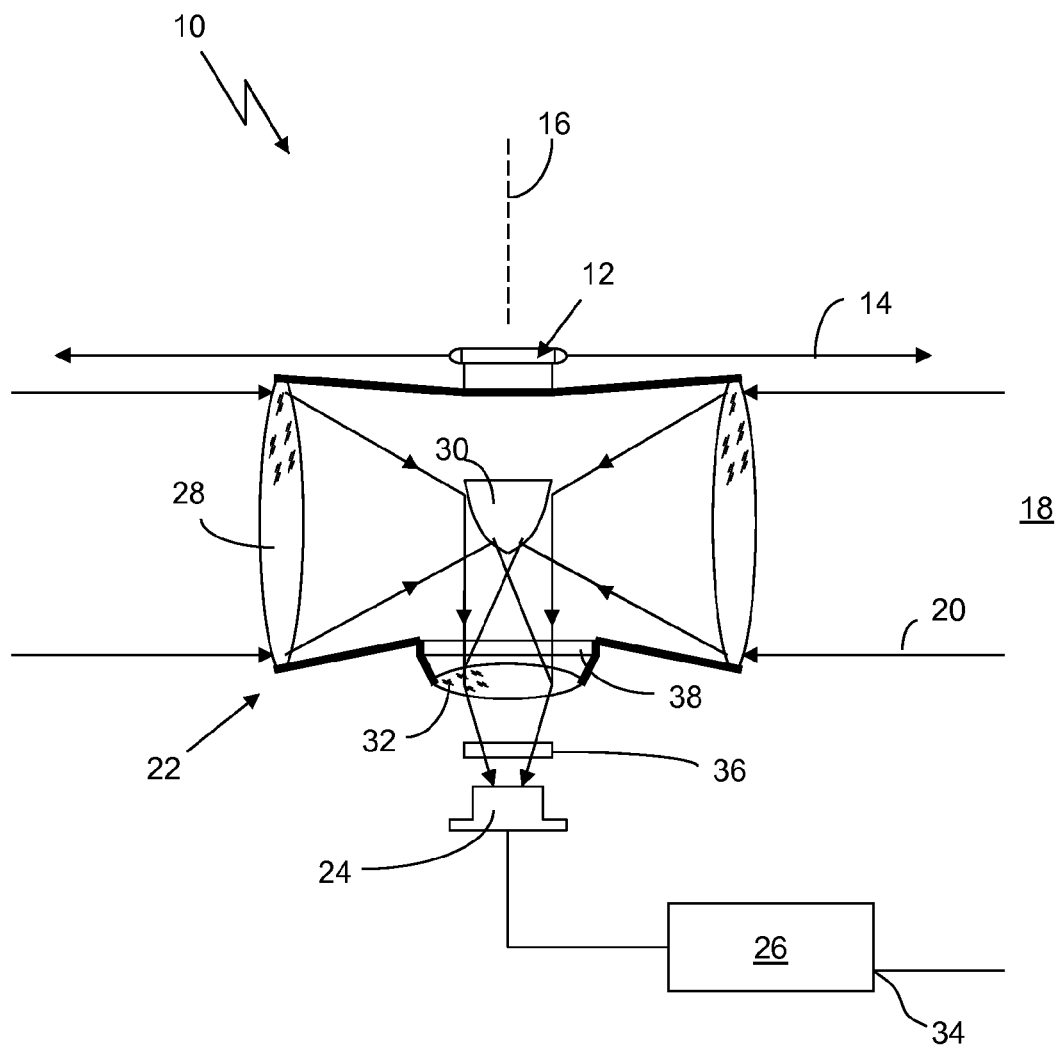

FIG. 1 shows an optoelectronic distance-measuring sensor 10 according to the invention. It comprises a light source 12 according to the invention which is described in detail further below. The light source 12 transmits a light beam 14 rotating about an axis 16 and transmitted into a monitoring region 18, wherein the transmitted light beam 14 scans periodically in a plane through the monitoring region 18.

If the transmitted light 14 hits an object in the monitoring region 18, it is partly reflected and returns back to the sensor 10 as receiving or remitted light 20. An omnidirectional receiving optics 22 directs the received light 20 to a light receiver 24 which converts the received light 20 into an electrical receiving signal. The received signal on the one hand and a signal representing the angle of the transmitted light beam on the other hand are fed to an evaluation unit 26 so that the evaluation can calculate a position of detected objects and/or an object contour from the time-of-flight between transmission of the transmitted light 14 and reception of the received light 20 and the direction of observation. The distance to the detected object can either be determined by a phase-based time-of-flight method in detecting a phase difference between the received signal and the amplitude modulated transmitted light 14, or by a pulse-based time-of-flight method based on the propagation time of transmitted light pulses, whereby the pulse-based method is preferred.

The exact structure of the omnidirectional receiving optics 22 is not essential for the invention. In the illustrated embodiment, these optics comprises a 360° receiving lens 28 which directs the received light 20 to the light receiver 24 by also using a free-form mirror 30 and a converging lens 32. It is sufficient if the light receiver is a single element only, for example, an ordinary photodiode or an avalanche photodiode (APD). Alternatively, an image sensor with a number of individual elements which can measure the time-of-flight may be used (smart pixels). The position of a pixel on the image sensor could thereby carry additional positional information of the detected object in itself, namely the angle within the monitoring plane 18 (azimuth).

The evaluation unit 26 acts also as the control unit of the light source 12. For this, the evaluation unit 26 is connected to the light source 12 in a manner not shown or with its drive circuit, also not shown. Object positions, object contours or other measurement data are outputted via an output 34. Alternatively, only raw data are provided at the output 34 and the evaluations are performed externally.

The receiving channel of sensor 10 is designed in such a way that the light receiver 20 receives the received light 24 from all directions in principle due to the omnidirectional optical system 22. If the light receiver 20 cannot resolve spatially, the angle information is only available through the light source 12 and through the control of the light source 12 by the evaluation unit 26, i.e. in which direction the transmitted light 14 is transmitted into the monitored zone 18.

Figure 2:
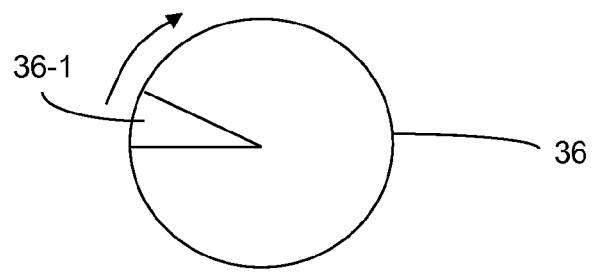

An electrically controllable optical element 36 is provided with which a directional selectivity is provided so that the light receiver 24 does not permanently receive light from the entire monitoring region 18, and thus would absorb a lot of ambient light. The electrically controllable element 36 comprises a plurality of zones having a variable light transmittance. For this purpose the electrically controllable element 36 has a liquid crystal display (LCD) for example. By controlling the evaluation unit 26 single angle segments become non-transparent to block light, and only one angular segment 36-1 in a selected viewing direction is transparent, so that the received light 20 is transmitted to the light receiver 24 only in this angular range 36-1. The electrically controllable optical element 36 has the function of a star-like aperture, as it is schematically exemplified in the plan view of FIG. 2. Naturally, the direction of the transmitted light 14 has to be synchronized with the electrically controllable optical element 36 on the receiving-side in order to transmit the transmitted light 14 in that angular range 36-1, that can be detected by the light receiver 24 at the same time.

The result is a kind of virtual rotational movement, in which the transmitted light 14 and the corresponding window for the received light 20 periodically scan the monitoring plane 18. For the function it is ultimately not crucial in which order the angular segments are switched transparently. Hence alternative activation schemes are possible.

In principle, it would also be conceivable that the electrically controllable optical element 36 may also be designed so that the function of a star-like aperture with a rotating angle segment is driven by the effect of electrowetting.

The angular segments need not necessarily be defined by the optical element 36. Also, a pixel structure of the light receiver 24 is conceivable, wherein each zone corresponds to a group of pixels and pixel of a pixel group are connected together to form suitable angular segments. The number and size of angle segments need not determine the angular resolution of the sensor 10 directly. If, for example, the transmitted light 14 has a more precise angular position, then the angular segment on the receiving side is only a coarse window for the received light 20 to allow less exposure to external light. In this case the angular position is determined by the transmitted light 14 and not by the transparent angular segment.

In order to further suppress stray light a filter 38 may be provided in a known manner in the receiving path of light, which, for example lets only pass light having the wavelength of the transmitted light 14.

A housing of the sensor 10 and corresponding mountings of the individual components are not shown in detail in FIG. 1 which is only a schematic representation.

FIG. 3 and FIG. 4 show the light source 12 which is essential to the invention, also only in a schematic way. The light source 12 comprises at least one light emitting element 40, which may be a laser chip for example, the laser light having a wavelength of 905 nm. The transmitted light 14 is deflected in different viewing directions by a new deflector 41. This new deflection unit 41 and its operation are described below.

The transmitted light 14 is coupled into a light-input-coupling element 43 in a suitable manner known per se, which may be an optical fiber of known type. The light-input-coupling element 43 is used for coupling light into a curved light-guiding element 42 which preferably may be a ring of fiber optics of polydimethylsiloxane (PDMS) or polycarbonate. The coupling can be done through a Y-type fiber piece which is not shown. The cross-section of the fiber ring can be typically 200*200 μm$^2$ and the diameter 5 to 20 mm.

A micro-channel 44 is adjacent to the convex outer side of this ring of fiber optics 42. Thus, the microchannel 44 is designed as a circular channel. The microchannel 44 has similar dimensions to the fiber ring 42.

Two polar fluids 46 and 48 are supplied in the microchannel 44. The two fluids do not mix and a first one of the fluids 46 has a refractive index which is smaller than the refractive index of the fiber ring 42. If the fiber ring 42 is made of polycarbonate, the refractive index is 1.585 and the refractive index of the first fluid 46 could be 1.3 (the first fluid could be a so-called "Cargille Immersion Liquid"). The refractive index of the second fluid 48 is bigger than or equal to that of the fiber ring 42. The first fluid 46 fills almost the entire channel 44 except for one very short section 50 in comparison to the total perimeter, in which there is a small droplet of the second fluid 48.

Now, the fiber ring 42 is configured such that the transmitted light which is coupled into it, is totally reflected in this fiber ring, which is ensured on the convex outer side of the fiber ring 42 by the different refractive indices of the fiber ring 42 and the first polar fluid 46. On the other side of the fiber ring 42 the total reflection may be accomplished by mirror-like surfaces.

Only in that portion of the fiber ring 42 in which the second fluid 48 is adjacent to the fiber ring 42, that is in section 50, there is no total reflection on the convex outer surface because the refractive index of the second polar fluid 48 is smaller or of the same magnitude as the fiber ring 42. Therefore, the transmitted light 14 can pass through the second fluid 48 and can emerge from the fiber ring 42. The second polar fluid 48 in portion 50 thus forms a window for the transmitted light 14.

The transmitted light 14 which is coupled out is focussed by means of a ring-shaped transmission lens 52 so that a transmitted light beam 14 with well defined parallel transmitted light is transmitted from the light source 12.

Further, a first electrode 54 and a plurality of second electrodes 56 are arranged at the boundary of the second channel 44. The electrode 54 extends in the longitudinal direction over the entire circumference. Here, for example, the electrode 54 is arranged on the top side 58 corresponding to the FIG. 3, and the second electrode 56 is arranged at the bottom side 60. There is a plurality of second electrodes 56 which each cover individually a small angular range 62. The second electrodes 56 are spaced apart by a distance such that different potentials can be applied to each second electrode 56. The control of the electrodes 54 and 56 takes place via the evaluation unit 26.

The electrodes 54 and 56 serve to apply appropriate potentials, so that forces act on the boundary surface between the polar fluids 48 and 46 in the longitudinal direction of the channel 44, as indicated by the arrow 64. Such forces arise due to the effect of electrowetting, as described in detail in L Yeo, J Friend. Electrowetting, Applications in Encyclopedia of Microfluidics and Nanofluidics (ed. Li D) pp. 606-615 (Springer, New York, 2008).

In this way, the drops of the second polar fluid 48 moves in the channel 44 and rotates about the axis 16. The transmitted light 14 can be coupled out only at that position where the droplet of the second polar fluid 48 is momentarily located. In the end, this leads to a transmission of transmitted light 14 through the light source 12 at varying angles between 0° and 360° and ultimately, a rotating laser beam 14 is obtained which rotates around the axis 16.

In a further embodiment, multiple light transmitting elements 40, i.e. a plurality of laser chips, could be provided, so that transmitted light could be coupled into the fiber ring at several points, e.g. at angular intervals of 120° as shown in FIG. 4. Also it could be possible that not only one single portion 50 with the second fluid 48 is provided but several of those. In that way a plurality of light beams can be transmitted in different angles at the same time.

The invention claimed is:

1. A light source for an optoelectronic sensor (10), which transmit light (14) in different observation directions, comprising a light transmitting element (40) for generation of transmitted light (14) and a deflection unit (41), with which the transmitted light (14) is deflected in different directions, characterized in that the deflection unit (41) comprises a curved light-guiding element (42) into which the transmitted light (14) is coupled, and a channel (44) immediately adjacent to a convex side of said light-guiding element (42), the channel (44) containing two polar fluids (46 and 48) having different refractive indexes, wherein the fluids are not mixed and are moved in said channel (44) in the longitudinal direction (64) by electrical forces due to the effect of electrowetting, wherein the refractive index of the first fluid (46) is smaller than that of the light-guiding element (42), so that the transmitted light (14) coupled into the light-guiding element (42) is totally reflected in those sections in which the first fluid (46) is adjacent said light-guiding element (42), and the refractive index of the second fluid (48) is equal to or greater than that of the light-guiding element (42), so that the coupled transmitted light (14) is uncoupled from the light-guiding element (42) in those sections (50) in which the second fluid (48) is adjacent to said light-guiding element (42).

2. The light source according to claim 1, characterized in that the light-guiding element is a ring of fiber optic of polydimethylsiloxane or polycarbonate.

3. The light source according to claim 2, characterized in that the second fluid covers only a fraction of the fiber ring perimeter and the rest of the channel is filled with the first fluid.

4. The light source according to claim 1, characterized in that electrodes are adjacent to the channel in order to rotate the two polar fluids in the circumferential direction.

5. A distance-measuring optoelectronic sensor (10) for detecting objects and/or object contours in a monitoring region (18) having a light source (12) for the transmission of transmitted light (14) into the monitoring region (18), a light receiver (24) for the reception of remitted or reflected received light (20) out of the monitoring region (18) and an evaluation unit (26) which is adapted to gain a position of detected objects and/or an object contour from the time-of-flight of the light between transmission of the transmitted light (14) and reception of the received light (20) and from the observation direction, characterized by the light source (12) of claim 1.

6. The sensor according to claim 5, characterized in that an omnidirectional optical receiving system is provided for directing received light from all viewing directions onto the light receiver.

7. The sensor according to claim 5, characterized in that upstream of the light receiver an electrically controllable optical element with a plurality of zones which light permeability can be controlled is arranged and in that a selectable viewing direction can be provided by higher light transmittance of zones which are associated with the chosen direction of observation and reduced light transmittance of the other zones.

8. The sensor according to claim 6, characterized in that the receiving omnidirectional optical system comprises a starlike aperture which divides the monitoring region into sectors.

9. The sensor according to claim 7, characterized in that the virtual rotation of the electrically controllable optical element is synchronized with the rotation speed of the second fluid.

\* \* \* \* \*